(12) United States Patent
Spooner

(10) Patent No.: US 7,031,347 B2
(45) Date of Patent: Apr. 18, 2006

(54) DATA COMMUNICATION LINK

(75) Inventor: Robert John Spooner, Lower Earley (GB)

(73) Assignee: Agere Systems Inc., Allentown, PA (US)

( * ) Notice: Subject to any disclaimer, the term of this patent is extended or adjusted under 35 U.S.C. 154(b) by 863 days.

(21) Appl. No.: 09/808,664

(22) Filed: Mar. 15, 2001

(65) Prior Publication Data
US 2001/0033568 A1    Oct. 25, 2001

(30) Foreign Application Priority Data
Mar. 15, 2000   (GB)   .................................... 0006291

(51) Int. Cl.
*H04L 12/54*    (2006.01)
(52) U.S. Cl. ...................... 370/503; 375/221
(58) Field of Classification Search ............... 370/503, 370/507, 509, 517, 518; 375/219, 221
See application file for complete search history.

(56) References Cited

U.S. PATENT DOCUMENTS

| | | | |
|---|---|---|---|
| 5,426,644 A |  | 6/1995 | Fujimoto |
| 6,140,926 A | * | 10/2000 | Hayden et al. ............. 340/635 |
| 6,167,077 A | * | 12/2000 | Ducaroir et al. ............ 375/219 |
| 6,201,829 B1 | * | 3/2001 | Schneider .................. 375/221 |
| 6,377,575 B1 | * | 4/2002 | Mullaney et al. ........... 370/360 |
| 6,618,395 B1 |  | 9/2003 | Kimmitt |
| 6,667,993 B1 |  | 12/2003 | Lippett et al. |
| 6,738,935 B1 | * | 5/2004 | Kimmitt ..................... 714/701 |
| 6,775,328 B1 | * | 8/2004 | Segaram ..................... 375/257 |

FOREIGN PATENT DOCUMENTS

| EP | 0533091 A2 | 3/1993 |
|---|---|---|
| EP | 0553091 A3 | 9/1993 |
| EP | 0996262 A1 | 4/2000 |

OTHER PUBLICATIONS

U.S. Appl. No. 60/180,665, filed Feb. 7, 2000; Inventor: Kimmett, Myles; entitled "Coding Sublayer for Multi-Channel Media With Error Correction".
Search Report and Examination Report for UK Application No. GB 0006291.9 corresponding to the Instant application.

* cited by examiner

*Primary Examiner*—Ricky Ngo
*Assistant Examiner*—Richard Chang
(74) *Attorney, Agent, or Firm*—Synnestvedt & Lechner LLP

(57) ABSTRACT

In order to enable high speed, high bandwidth data transfer between two ASIC devices, for example in a backplane, a wide parallel input data word is divided into a smaller number of words, and each smaller word is converted to serial form and then transmitted over a respective sub-link at a high clock rate relative to the system clock. At the receiving side, the clock is recovered from the serial words, and the serial words are converted back to parallel form. An alignment process is then carried out, firstly involving detecting the positions of the bits of the words and then storing the words in a buffer FIFO register. The words are clocked out of the FIFO register in synchronism under control of the system clock once it is detected that valid words are received in the FIFO registers.

10 Claims, 4 Drawing Sheets

DATA COMMUNICATION LINK

CROSS-REFERENCE TO RELATED APPLICATION

This application claims priority of Great Britain Application No. 0006291.9, which was filed on Mar. 15, 2000.

TECHNICAL FIELD

The present invention relates to a data communication link for high speed, high bandwidth applications.

BACKGROUND

In applications such as providing a data communication link between two Application Specific Integrated Circuits (ASICs) in a local backplane of a computing system, very high data rates may be required, e.g. an average data rate of at least 4.8 Giga bits per second (Gbps). The data link may be 64 bits wide.

Of the various possibilities for implementing such a link, it is possible to provide an interface that transfers data from the transmitting ASIC to the receiving ASIC as a single parallel word with a synchronising clock signal running at the system clock rate CK, say 78 MHz. However, for a data word of 64 bits to achieve a data transfer rate of 4.8 Gbps this would require 65 device pins, which for many applications would be either impractical or too costly to provide in the ASICs.

A synchronous interface could be used using a smaller number of pins, by multiplexing a 64 bit wide data word N times onto W bits (=64/N) and by providing a synchronising clock. However with a clock signal running at 78 MHz, the bandwidth would be reduced to W*CK=BW/N, which would give an unacceptably slow data transfer rate.

In order to achieve a bandwidth of 4.8 Gbps, the transfer rate may be multiplied N times. A synchronous interface which has a resultant Transfer Clock, N * CK, of less than 200 MHz may be practical. Above 200 MHz, which would be necessary to achieve the desired transfer rate of 4.8 Gbps, each data bit would be valid for a maximum of 5 ns, reducing further when rise-fall times of the interconnect signals and input/output buffers are included. The task of achieving a robust design, ensuring that all W bits are aligned such that the synchronising clock can always capture valid data bytes at the receiving ASIC, is far from trivial.

SUMMARY OF THE INVENTION

With a view to avoiding the above noted problems, the invention provides a data transmitter having: a transfer clock generator, responsive to the system clock, generating a transfer clock at a high rate relative to the system clock; and a parallel to serial register, for dividing an input word into a plurality of smaller words and transmitting them over corresponding serial sub-links in response to the transfer clock.

In an alternative embodiment, the invention further provides a receiver having: a plurality of serial to parallel registers coupled to corresponding serial sub-links, for converting received serial data words from the sub-links into parallel form; and, a clock generator, responsive to the received data, for generating a low speed clock with a frequency nominally equal to the system clock.

BRIEF DESCRIPTION OF THE DRAWING

A preferred embodiment of the invention will now be described with reference to the accompanying drawings wherein.

DESCRIPTION OF A PREFERRED EMBODIMENT

Figure 1:
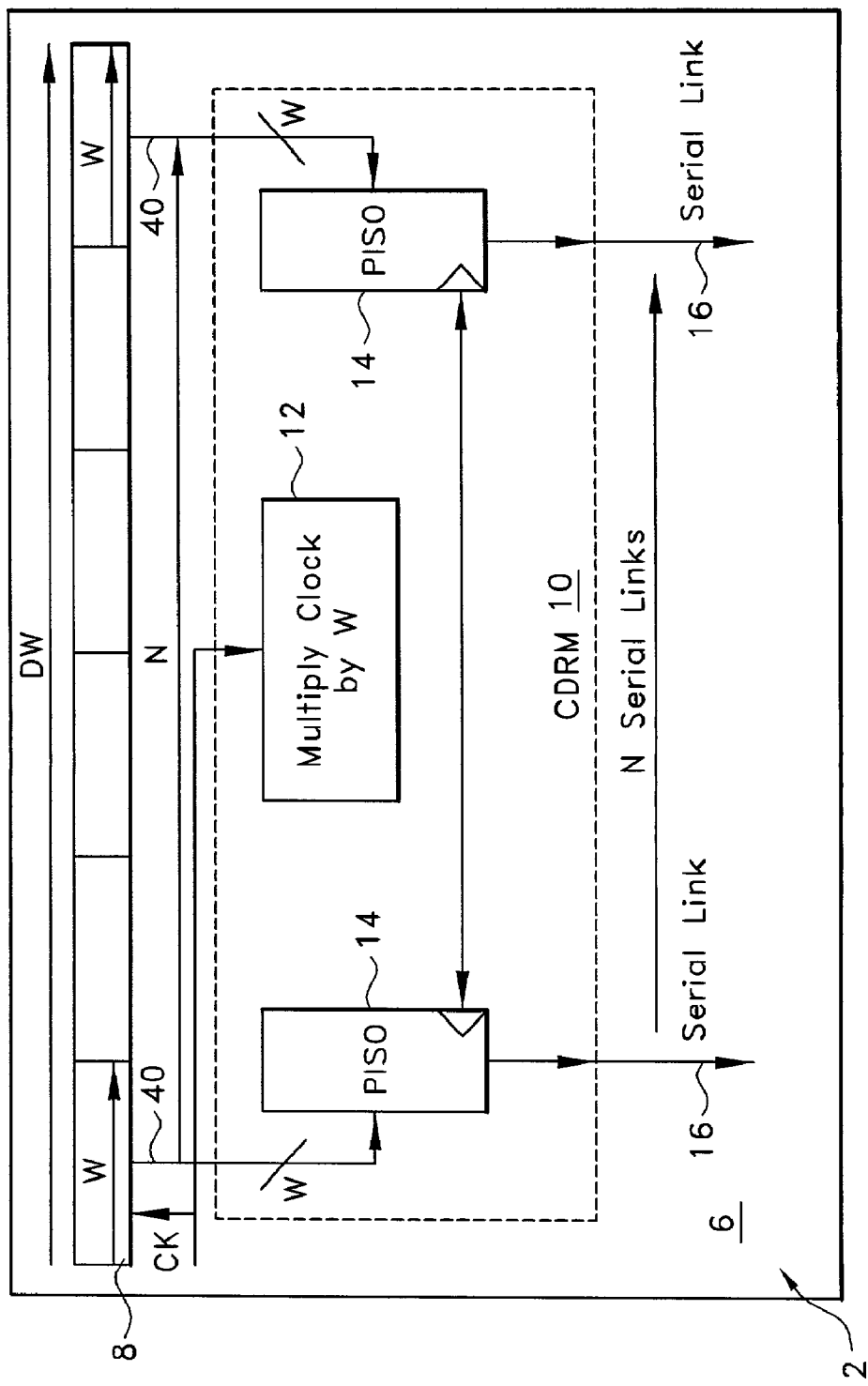
FIG. 1 is a schematic view of the transmit interface of a first ASIC of the data communication link of the invention.
Figure 2:
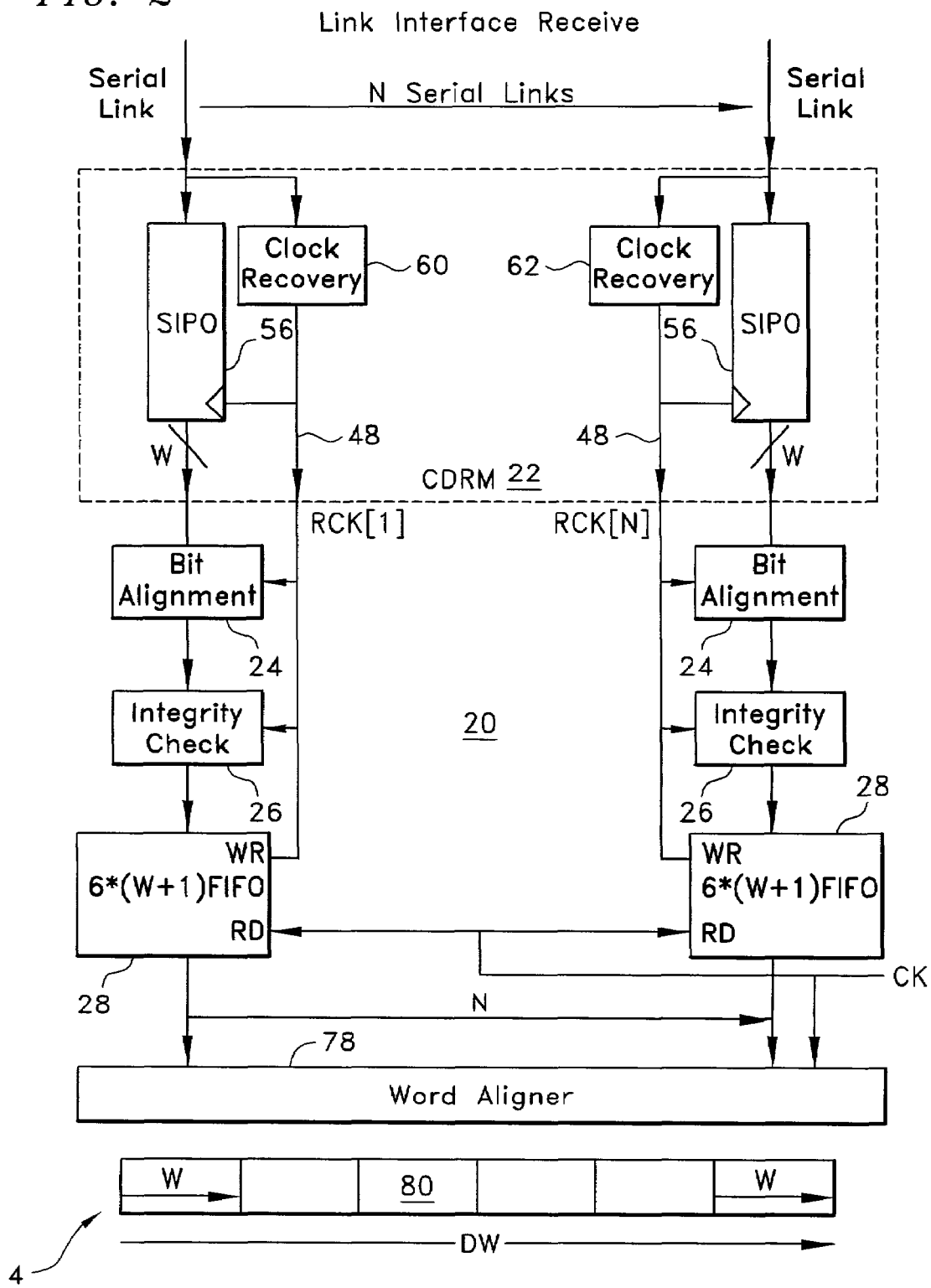
FIG. 2 is a schematic block diagram of the receive interface of a second ASIC of the data communication link of the invention.

Referring to FIGS. 1 and 2 of the drawing, a Link Interface between first and second ASICs 2, 4 includes an interface 6 in ASIC 2. In one embodiment:

$$DW = W*N$$

Where;
DW=Bit width of wide data word
W=Bit width of sub-data word
N=An integer value, greater than 1

The data bandwidth across the link is given as;
$$BW = DW*CK$$

Where;
BW=Bandwidth in Mega bits per second (Mbps)
CK=Transfer Clock in Mega Hertz (MHz)

For example, W=8, N=8, DW=64. The Transfer Clock, CK, is 78 MHz giving a BW of 4992 Mbps. However the invention is not limited to these specific values.

Interface 6 in ASIC 2 has a register 8 for breaking down the wide input data words, DW, into N (in this embodiment 8) smaller sub-words W (each 8 bits long). Each sub-word W is treated independently, using a Clock Data Recovery Module 10 (CDRM) macrocell. CDRM 10 has a multiplier 12 for multiplying the clock CK, W (8) times and respective parallel to serial (PISO) converters 14 for operating on each of N, W bit words. Each serial word is transmitted over a respective sub-link 16.

Referring to FIG. 2, the receive ASIC 4 has an interface 20. The serial links 16 are coupled to another CDRM macrocell 22, in which a parallel W bit word and clock is recovered for each of the N serial links.

Figure 4:
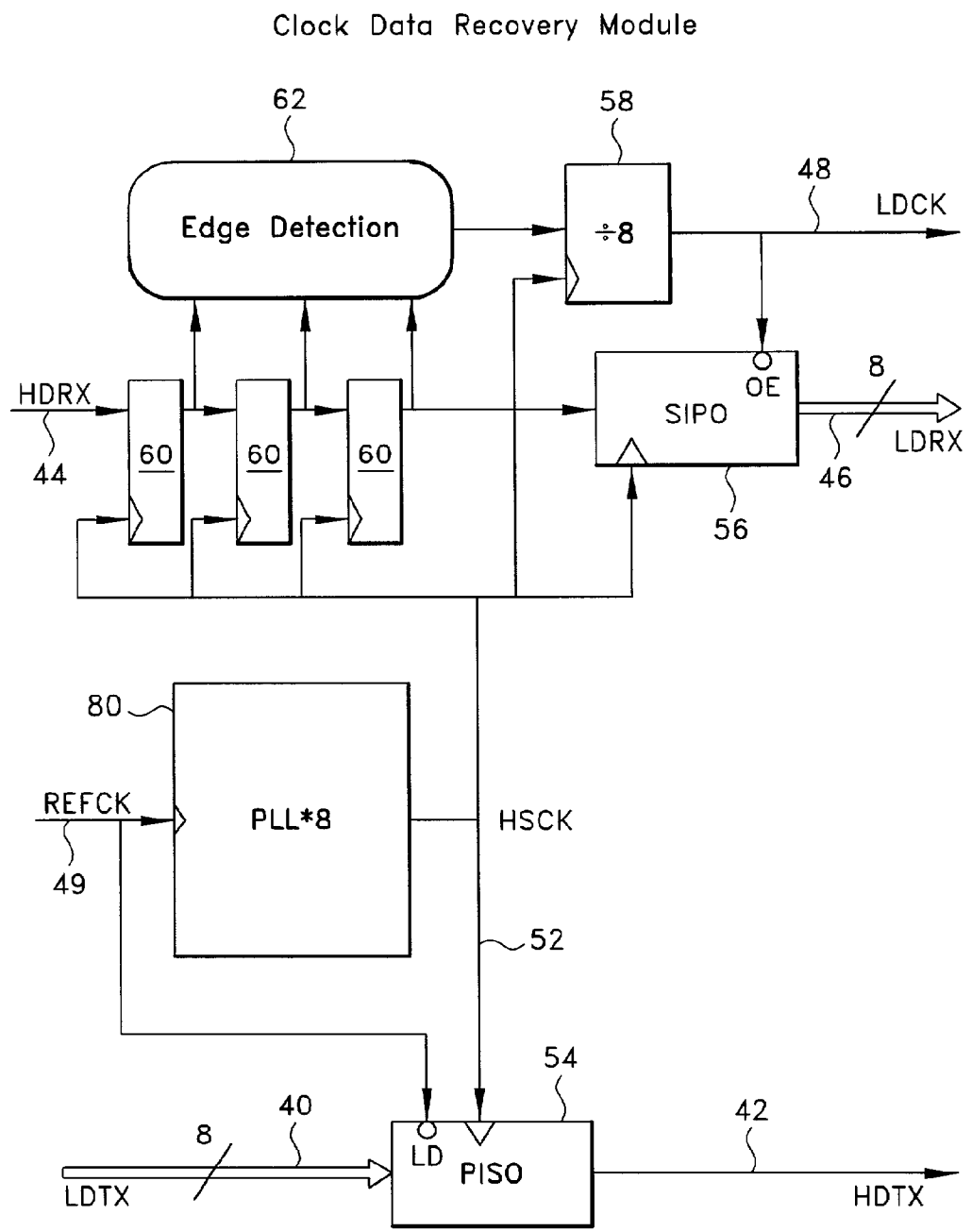
FIG. 4 is a schematic block diagram of a Clock Data Recovery Module (CDRM) used in both the interfaces of FIGS. 1 and 2.

FIG. 4 shows in more detail a CDRM 10, 22. The module 10, 22 has two primary functions. In transmit, it takes Low Speed Parallel Data (LDTX) on line 40 and creates High Speed Serial Data (HDTX) on line 42. In receive, it operates in reverse, taking High Speed Serial Data (HDRX) on line 44 and creating Low Speed Parallel Data (LDRX) on line 46. In addition, the receive operation also recovers a Low Speed Clock (LDCK) on line 48 from the serial data, that is phase aligned with the LDRX data. A Reference System Clock (REFCK) on line 49 is applied to a Phase Locked Loop 50 which multiplies the clock rate by a factor of 8 to provide a High Speed Clock (HSCK) on line 52. HSCK is applied to a parallel to serial register 54 and to a serial to parallel register 56. HSCK is also applied to a divide by 8 unit 58 and a chain of three toggles 60. The outputs of toggles 60 are detected by an edge detector device 62 which provides an output to divider unit 58. The output of divider unit 58 comprises the Low Speed Clock (LDCK) on line 48. The operation of the circuit of FIG. 4 is as follows:

For Transmit, Low Speed Data (LDTX) on line 40 will be presented to the CDRM at the rate of the Reference Clock (REFCK). The Reference Clock will be multiplied in frequency eight times by Phase Locked Loop (PLL) 50 to create High Speed Clock (HSCK) on line 52. LDTX data on line 40 will be loaded into a Parallel Serial Output (PISO) register 54 at the REFCK rate, and clocked out serially at the HSCK rate to form HDTX data on line 42.

For Receive, the High Speed Clock (HSCK) will be divided by eight at 58 to create a Low Speed Clock (LDCK) output. However, the phase of this clock must be adjusted so that its associated Low Speed Data (LDRX) is stable at the time of the active edge of LDCK. This is done by edge detection and phase adjustment circuit 60, 62 which monitors the High Speed Data (HDRX) on line 44. HDRX is also passed into a Serial Parallel Output (SIPO) register 56 to create the Low Speed Received Parallel Data (LDRX) on line 46. The output from the SIPO 56 will be enabled on the opposite edge to the active edge of its associated clock LDCK.

The number of transmit and sub-links are replicated 8 times in this example. However, there will generally only be a single PLL per CDRM macrocell.

On the receive side, the serial links are passed through CDRM macrocell 22, and a W bit word and clock will be recovered for each of the N serial links. The CDRM 22 has no knowledge of the boundary between one W bit word and the next within the serial data stream and it is therefore the first task of the Interface 20 to identify the correct bit alignment within each sub-link. Having recovered the W bit words for each sub-link, all N of the W bit words have to be aligned and synchronised to recreate the original DW width word.

The bit alignment is achieved by the transmit side sending consecutive initialisation words constructed by ASIC 2. These initialisation words (of W bits) have the property that however many times the word is shifted right or left within another word that is 2W bits wide, there is a unique position that defines the bit alignment. For example consider an initialisation word, for W=8, of "10111000". A register 24 that is 2W words wide holds the previously received and currently received words of W bits as shown in the above table. The initialisation word is sent at least twice followed by another synchronisation word (user defined) delimiter to indicate the start of transmission of true data. The position of the word is located in the register by means of a state machine (not shown) and this information is relayed to subsequent stages.

| Previous & Current Word | Bit Alignment |
|---|---|
| 10111000xxxxxxxx | 0 |
| x10111000xxxxxxx | 1 |
| xx10111000xxxxxx | 2 |
| xxx10111000xxxxx | 3 |
| xxxx10111000xxxx | 4 |
| xxxxx10111000xxx | 5 |
| xxxxxx10111000xx | 6 |
| xxxxxxx10111000x | 7 |

During transmission, each ASIC transmitting/receiving interface will respectively create/recreate a cyclic redundancy code (CRC) from the true data. The CRC words are inserted at a pre-determined interval, programmed to both transmit and receive sides. After this interval the transmitted CRC should equal the recreated CRC. If not, then either bit alignment has been lost or a corruption has occurred during the transmission of the data. This provides an Integrity Check individually on each of the serial links.

Thus, as shown in FIG. 2, subsequent to parallel conversion in CDRM 22, the parallel words are placed in a bit alignment register 24 in each sub-link for detecting bit alignment. This is effected by a state machine (not shown) locking onto the position of the initialisation word within the register, and passing the bit aligned word to the next stage. In the next stage, an Integrity Check is performed on the CRC word at 26.

The bit alignment and the Integrity Check are performed in each sub-link using the recovered clock generated for that serial link. There is no guarantee of any phase relationship between any of the N recovered clock (RCK[n])s, and each of the recovered clocks may be jittering (except that the recovered clocks will be within one clock cycle of one another). However, the average frequency of all recovered clocks and that of the Transfer Clock, CK, on the transmit side must be exactly the same, since the reference clock to both the transmit and receive ASICs will be driven from the same crystal oscillator. A mechanism is therefore required to re-align the N recovered sub-words and resynchronise the wide data word back to the Transfer Clock, CK. This is done by using a short First In First Out (FIFO) 28, 6 words long, at the end of each serial link.

The recovered sub-word plus a marker bit (W+1 bits) is written to the FIFO 28 by its associated recovered clock on line 48. The marker bit indicates whether that data word was Transmitted Synchronisation or Integrity Check Word. The very first word to be written by each of the links, will be a synchronisation word (marker bit set) and the second will be the first sub-word of true data. The first write will occur at a slightly different time for each link, but by the time the second write occurs, all will have written at least once. The addressing of the FIFOs may use Johnson coding, as more clearly seen in FIG. 3. An address generator 32 provides a Johnson scheme of addressing to the write read address 34 of the respective FIFO 28.

Figure 3:
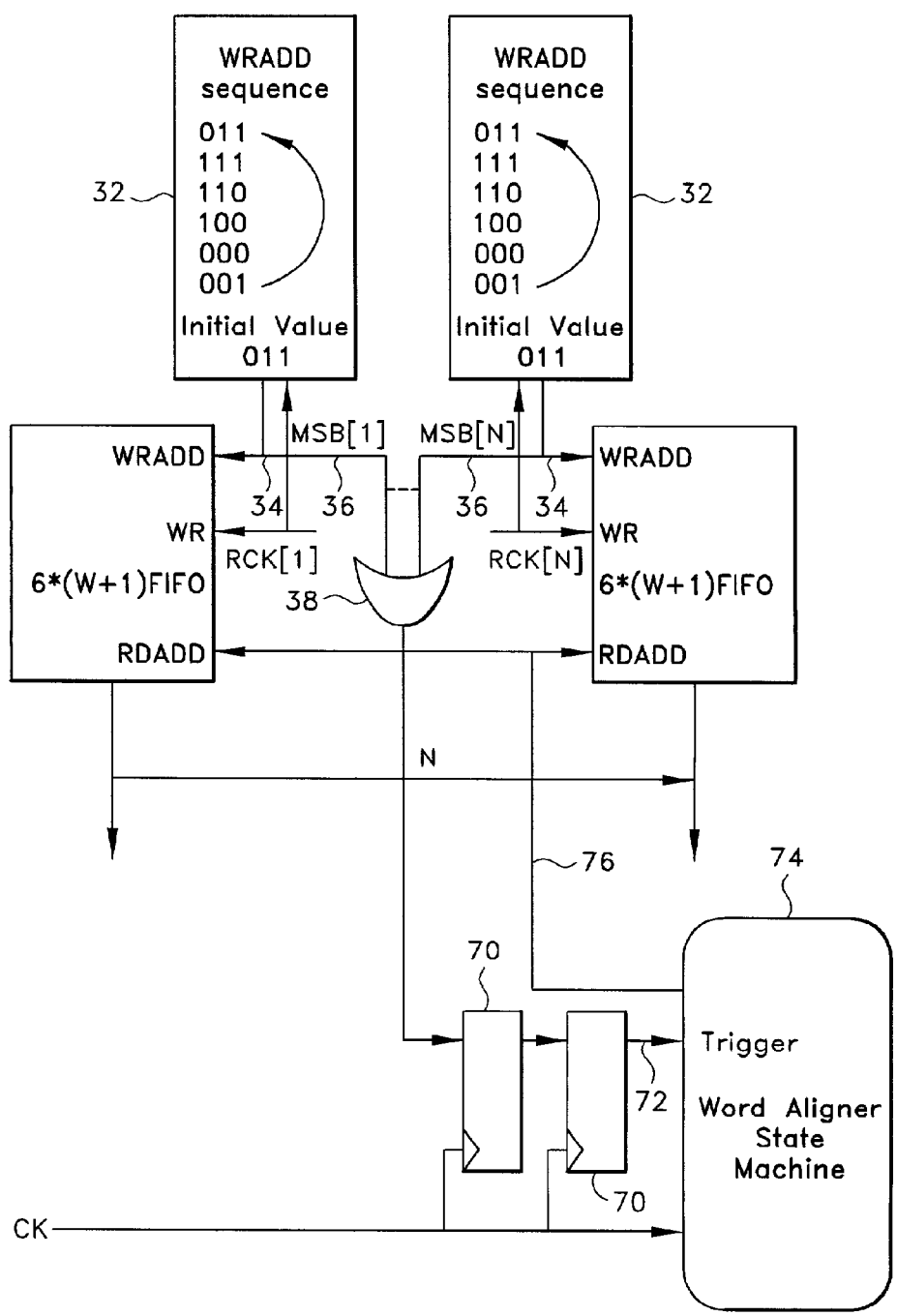
FIG. 3 is a more detailed diagram of the control mechanism for aligning received words in each sub-link of the link of FIGS. 1 and 2.

The initial value of the address is 011 and the address scheme changes as indicated in FIG. 3. The most significant bit of the addresses of the sub-links are coupled by lines 36 to an OR gate 38. The output of the OR gate 38 is coupled by two metastability registers 70 to provide a trigger signal on line 72 to a state machine 74. State machine 74 provides an output on line 76 to control the reading out of the FIFO registers 28.

Thus, only a single address bit of FIFO's 28 changes per write and by ensuring that the top address bit is set on the second write, that address bit can be logically OR'd with the equivalent bit from all N links. This single bit signal, which goes high when the first word in a sub-link is received, is resynchronised via the metastability registers 70. By this time, since it is known all FIFO registers will be written to within a clock cycle of one another, all FIFO's will contain words, and the state machine 74 triggers the Word Aligner to read from all N FIFO's in parallel at the Transfer Clock rate, CK. This read should therefore occur when each of the FIFOs contain approximately four words. As the average frequency of the read and write clocks to the FIFO is the same each FIFO should always contain approximately four words. A FIFO that is at least six deep will isolate against jitter on the recovered clocks.

The very first FIFO read will all be synchronised subwords but the second will be the recovery of the first true wide data word. The output of the FIFOs are applied to a Word Aligner register 78 which reconstitutes the original data word 80 (FIG. 2). Word Alignment is checked at the same programmed interval used by the bit alignment, because at this time, and only at this time, all of the marker bits in each of the N FIFO's will be set.

The scheme outlined provides a robust high speed, high bandwidth local link by using a number of serial asynchronous links in parallel.

Thus, it will now be understood that there has been disclosed a new method and apparatus for providing a data communication link. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. In an integrated circuit having a system clock, a transmitter comprising:
   a transfer clock generator, responsive to the system clock, generating a transfer clock at a high rate relative to the system clock; and
   a parallel to serial register, for dividing an input word into a plurality of smaller words and transmitting them over corresponding serial sub-links in response to the transfer clock;
   wherein the transfer clock generator comprises a phase locked loop; and
   wherein the transmitter is initialized cmy sending one or more cmit alignment code words.

2. The transmitter as recited in claim 1, wherein a CRC code word is transmitted at intervals.

3. In an integrated circuit having a system clock, a receiver comprising:
   a plurality of serial to parallel registers coupled to corresponding serial sub-links, for converting received serial data words from the sub-links into parallel form; and
   a clock generator, responsive to the received data, for generating a low speed clock with a frequency nominally equal to the system clock;
   a buffer memory in each sub-link for storing a predetermined number of received words; and
   a circuit for reading the buffer memories in synchronism under control of the system clock in order to reconstitute the input data word.

4. The receiver according to claim 3, wherein the buffer memories each comprise a FIFO register.

5. The receiver according to claim 4, wherein the FIFO registers are addressed by an addressing scheme wherein only one bit of the address changes for incremental addresses.

6. The receiver according to claim 5, wherein a predetermined bit of the address of each FIFO are compared and employed to generate a trigser signal for actuating a state machine to cause reading of the FIFO registers.

7. In an integrated circuit having a system clock, a receiver comprising:
   a plurality of serial to parallel registers coupled to corresponding serial sub-links, for converting received serial data words from the sub-links into parallel form; and
   a clock generator, responsive to the received data, for generating a low speed clock with a frequency nominally equal to the system clock;
   wherein the low speed clock generator includes an edge detector for detecting incoming data and providing an output to a divider for aligning the low speed clock with recovered data and for applying the same to the serial to parallel register for clocking out parallel words from the register.

8. The receiver according to claim 7, wherein the receiver includes a bit alignment register to store received bit alignment words in order to locate the position of the bits in the serial to parallel register.

9. The receiver according to claim 8, wherein the receiver includes a CRC generator for generating a CRC code word in response to the received data, and a check circuit for checking a received CRC code word against the generated CRC code word.

10. In an integrated circuit having a system clock, a transceiver comprising:
    a receiver, including
       a piuraiity of serial to parallel registers coupled to corresponding serial sub-links, for converting received serial data words from the sub-links into parallel form, and
       a clock generator, responsive to the received data, for generating a low speed clock with a frequency nominally equal to the system clock; and
    a transmitter as recited in claim 1 and adapted to be in communication with the receiver.

* * * * *